(12) United States Patent
Gibbs et al.

(10) Patent No.: US 11,052,783 B2
(45) Date of Patent: Jul. 6, 2021

(54) CONTROL OF DEVICE HAVING MULTIPLE RECHARGEABLE PACKS WITH DIFFERENT CAPACITIES FOR OPTIMAL ENERGY DELIVERY

(71) Applicant: GM GLOBAL TECHNOLOGY OPERATIONS LLC, Detroit, MI (US)

(72) Inventors: James C. Gibbs, Brighton, MI (US); Brandon R. Jones, White Lake, MI (US); Garrett M. Seeman, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 251 days.

(21) Appl. No.: 16/433,457

(22) Filed: Jun. 6, 2019

(65) Prior Publication Data
US 2020/0384880 A1 Dec. 10, 2020

(51) Int. Cl.
*B60L 53/66* (2019.01)
*H02J 7/00* (2006.01)
*B60L 58/18* (2019.01)

(52) U.S. Cl.
CPC ............ *B60L 53/665* (2019.02); *B60L 58/18* (2019.02); *H02J 7/0021* (2013.01); *B60L 2240/12* (2013.01); *B60L 2240/54* (2013.01); *B60L 2250/26* (2013.01); *B60Y 2200/91* (2013.01); *B60Y 2300/91* (2013.01)

(58) Field of Classification Search
CPC ........ B60L 53/665; B60L 58/12; B60L 58/22; B60L 58/18; B60L 2240/12; B60L 2250/26; B60L 2240/54; H02J 7/0047; H02J 7/0048; H02J 7/0049; H02J 7/005; H02J 7/0013; H02J 7/0014; H02J 7/0016; H02J 7/0018; H02J 7/0019; H02J 7/0024; H02J 7/0025; H02J 7/0071; H02J 2310/48; B60Y 2300/91; B60Y 2200/91; Y04S 30/14; Y02T 90/16; Y02T 90/167; Y02T 90/12; Y02T 10/7072; Y02T 10/70
USPC ....................................................... 320/134
See application file for complete search history.

(56) References Cited

U.S. PATENT DOCUMENTS

| 5,889,386 A * | 3/1999 | Koenck ................ H02J 7/0072 |
| | | 320/136 |
| 8,120,320 B2 * | 2/2012 | Cawthorne ........... H02J 7/0063 |
| | | 320/116 |
| 8,405,355 B2 * | 3/2013 | Minarcin ................ B60L 58/12 |
| | | 320/132 |

(Continued)

*Primary Examiner* — M Baye Diao
(74) *Attorney, Agent, or Firm* — Quinn IP Law

(57) ABSTRACT

System and method of controlling operation of a device having multiple rechargeable packs configured to store energy. The multiple rechargeable packs include at least one primary pack characterized by a first capacity and at least one auxiliary pack characterized by a second capacity, the first capacity being greater than the second capacity. A controller is configured to selectively command one or more of the multiple rechargeable packs to begin at least one of discharging and charging. When an estimated end of trip time is less than or equal to a discharging time of the at least one auxiliary pack, the discharging of the at least one auxiliary pack is begun. When the estimated end of trip time is greater than the discharging time, the discharging is delayed until the respective state of charge of the at least one primary pack reaches a first threshold.

20 Claims, 3 Drawing Sheets

(56) References Cited

U.S. PATENT DOCUMENTS

| | | | | |
|---|---|---|---|---|
| 8,629,657 B2* | 1/2014 | Kishiyama | ............... | B60L 53/11 320/132 |
| 2012/0194130 A1* | 8/2012 | Patino | ................. | H01M 10/482 320/112 |
| 2014/0159671 A1* | 6/2014 | Kawahara | ............. | H02J 7/0021 320/134 |
| 2014/0167657 A1* | 6/2014 | Nishikawa | ............... | B60L 58/21 318/139 |
| 2015/0329008 A1* | 11/2015 | Karlson | ................. | B60L 58/15 701/22 |
| 2019/0054838 A1* | 2/2019 | Stec | ........................ | B60L 53/00 |

* cited by examiner

CONTROL OF DEVICE HAVING MULTIPLE RECHARGEABLE PACKS WITH DIFFERENT CAPACITIES FOR OPTIMAL ENERGY DELIVERY

INTRODUCTION

The present disclosure relates in general to controlling operation of a device having multiple rechargeable packs with at least two different capacities. More specifically, the disclosure pertains to controlling the discharging and/or charging of the multiple rechargeable packs for optimal energy delivery. The use of purely electric vehicles and hybrid vehicles, such as battery electric vehicles, range-extended electric vehicles, hybrid electric vehicles, plug-in hybrid electric vehicles and fuel cell hybrid electric vehicles, has greatly increased over the last few years. Fully and partially electric vehicles generally include an energy storage component, such as a high voltage battery, which requires periodic recharging. The presence of multiple rechargeable packs with different capacities complicates the issue of how and when to charge and discharge the different packs for optimal energy delivery.

SUMMARY

Disclosed herein are a system and method of controlling operation of a device having multiple rechargeable packs with at least two different capacities. Various strategies are presented for controlling the discharging and/or charging of the multiple rechargeable packs to allow for optimal energy delivery. The system includes a controller configured to selectively command one or more of the multiple rechargeable packs to begin discharging and/or charging. The multiple rechargeable packs include at least one primary pack characterized by a first capacity and at least one auxiliary pack characterized by a second capacity, the first capacity being greater than the second capacity. Each of the multiple rechargeable packs defines a respective state of charge.

The controller has a processor and tangible, non-transitory memory on which instructions are recorded. Execution of the instructions by the processor causes the controller to obtain an estimated end of trip time based in part on information selected by a user via a user interface, and determine a discharging time for the at least one auxiliary pack. When the estimated end of trip time is less than or equal to the discharging time, the discharging of the at least one auxiliary pack begins. When the estimated end of trip time is greater than the discharging time, the discharging of the at least one auxiliary pack is delayed until the respective state of charge of the at least one primary pack reaches a first threshold.

In one example, the first threshold corresponds to the respective state of charge of the at least one primary pack when a regeneration event is permitted. The regeneration event may be characterized by an energy loss during a deceleration of the device being at least partially re-directed to the at least one primary pack. In another example, the first threshold is selected to be between 90% and 95%. Additionally, the controller may be configured to selectively pause the discharging of the at least one auxiliary pack during a regeneration event.

The multiple rechargeable packs may be respectively configured as removable modules respectively having at least one of an energy transfer converter and a switch. The controller may be configured to determine if the respective state of charge of the at least one primary pack is less than or equal to the first threshold. The controller may be configured to employ a first discharge mode to discharge the at least one auxiliary pack when the respective state of charge of the at least one primary pack is less than or equal to the first threshold. The first discharge mode may be characterized by the respective state of charge of the at least one auxiliary pack tracking the respective state of charge of the at least one primary pack to within a predefined percentage.

The controller may be configured to determine if the respective state of charge of the at least one primary pack is less than or equal to a second threshold, and employ a second discharge mode to discharge the at least one auxiliary pack when the respective state of charge of the at least one primary pack is less than or equal to the second threshold. In one example, the second threshold is between 10% and 15%. The second discharge mode may be characterized by a constant discharge rate selected such that a total discharge time of the at least one auxiliary pack is less than or equal to the total discharge time of the at least one primary pack.

When the respective state of charge of the at least one primary pack is greater than the first threshold, the controller may be configured to obtain a rate of change in the respective state of charge of the at least one auxiliary pack ($dSOC_A/dt$) and the rate of change in an overall state of charge of the multiple rechargeable packs ($dSOC_O/dt$). When the rate of change in the overall state of charge ($dSOC_O/dt$) is greater than the rate of change in the respective state of charge of the at least one auxiliary pack ($dSOC_A/dt$), the second discharge mode is employed.

Obtaining the rate of change in the overall state of charge ($dSOC_O/dt$) of the multiple rechargeable packs may include obtaining an estimated energy consumption for the multiple rechargeable packs based at least partially on a driving model of the user, via the controller. Obtaining the rate of change in the overall state of charge ($dSOC_O/dt$) of the multiple rechargeable packs may include obtaining one or more correction factors based in part on the information selected by a user via a user interface, including a first correction factor for highway speed and a second correction factor for auxiliary load use.

The system may include a plurality of sensors configured to obtain respective data, the plurality of sensors including at least one of a speed sensor, a brake pedal force sensor, an accelerator pedal force sensor, a lateral accelerometer, a longitudinal accelerometer, a roll sensor and a pitch sensor. The controller may be programmed to store a plurality of statistical models of driving style and construct the driving model of the user by correlating the respective data with at least one of the plurality of statistical models of driving style.

A charging unit may be selectively connectable to and configured to charge at least one of the multiple rechargeable packs at a battery charging rate. The controller is configured to determine the battery charging rate based in part on a time of day setting, a target charge level and a respective temperature of the multiple rechargeable packs. An overall charging time is determined for the multiple rechargeable packs and an auxiliary charging time is determined for the at least one auxiliary pack. Charging of the at least one auxiliary pack may begin when the auxiliary charging time is greater than the overall charging time.

The controller may be configured to command the charging of the at least one auxiliary pack to a predefined bulk rate and obtain an additional cost for charging the at least one auxiliary pack from the predefined bulk rate to a maximum state of charge. The controller is configured to determine a cost optimization point based on the information provided by the user. When the additional cost is greater than the predefined cost optimization point, the charging of the at least one auxiliary pack at the charging unit may be discontinued.

The above features and advantages and other features and advantages of the present disclosure are readily apparent from the following detailed description of the best modes for carrying out the disclosure when taken in connection with the accompanying drawings.

DETAILED DESCRIPTION

Figure 1:
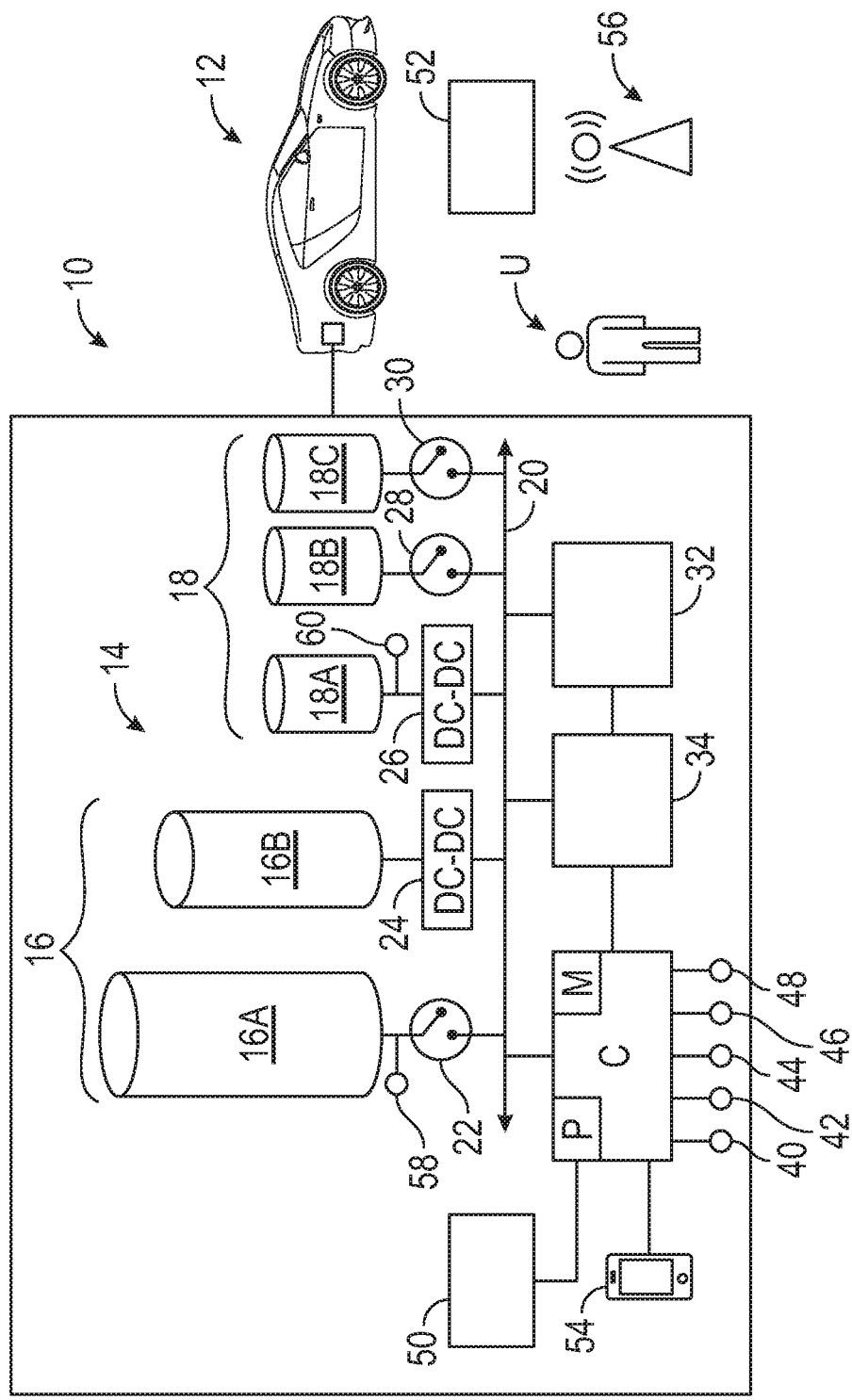
FIG. 1 is a schematic diagram of a system for controlling operation of a device having multiple rechargeable packs, the system having a controller.

Referring to the drawings, wherein like reference numbers refer to like components, FIG. 1 schematically illustrates a system 10 for controlling operation of a device 12 having multiple rechargeable packs 14. The device 12 may be a mobile platform, including, but not limited to, standard passenger car, sport utility vehicle, light truck, heavy duty vehicle, ATV, minivan, bus, transit vehicle, bicycle, robot, farm implement (e.g. tractor), sports-related equipment (e.g. golf cart), boat, plane and train. The device 12 may take many different forms and include multiple and/or alternate components and facilities.

The multiple rechargeable packs 14 are configured to store energy and may include battery cells of different chemistries, including but not limited to, lithium-ion, lithium-iron, nickel metal hydride and lead acid batteries. The multiple rechargeable packs 14 may be connected in series, in parallel or a combination of both. An energy storage unit that is over-utilized will wear out sooner, and one that is under-utilized will not provide its intended energy. The system 10 ensures that the multiple rechargeable packs 14 are optimally charged and discharged in accordance to an overall usage requirement across various user profiles and types of mobile platforms.

Referring to FIG. 1, the multiple rechargeable packs 14 may be divided into a first set of packs 16 having a relatively large capacity, and a second set of packs 18 having a relatively smaller capacity. The multiple rechargeable packs 14 includes at least one primary pack 16A characterized by a first capacity and at least one auxiliary pack 18A ("at least one" is omitted henceforth) characterized by a second capacity. The first capacity is greater than the second capacity. In a non-limiting example, the first capacity is about ten times greater than the second capacity. As shown in FIG. 1, the multiple rechargeable packs 14 may include additional packs: a second primary pack 16B, a second auxiliary pack 18B and third auxiliary pack 18C.

Referring to FIG. 1, the multiple rechargeable packs 14 may be operatively connected to or in electronic communication with a vehicle buss 20, via a connector, such as a switch or a DC-DC (direct current to direct current) converter. The multiple rechargeable packs 14 may be respectively configured as removable modules respectively having at least one of an energy transfer converter (e.g. a DC-DC converter) and a switch. In other words, individual ones of the multiple rechargeable packs 14 may be removed without having to remove the entire multiple rechargeable packs 14. In the example shown in FIG. 1, the vehicle buss 20 is coupled to the primary pack 16A, second primary pack 16B, auxiliary pack 18A, second auxiliary pack 18B and third auxiliary pack 18C, respectively, via a first switch 22, a first DC-DC converter 24, a second DC-DC converter 26, a second switch 28 and a third switch 30. Referring to FIG. 1, a power inverter 32 may be configured to convert DC current to AC current and deliver energy from the multiple rechargeable packs 14 to a motor 34 of the device 12.

Referring to FIG. 1, a controller C is configured to selectively command one or more of the multiple rechargeable packs 14 to begin (or end) discharging and/or charging. The controller C includes at least one processor P and at least one memory M (or non-transitory, tangible computer readable storage medium) on which instructions are recorded for executing at least one method. The memory M can store controller-executable instruction sets, and the processor P can execute the controller-executable instruction sets stored in the memory M. A first method 100, a second method 150 and a third method 400 are described below with reference to FIGS. 2, 3 and 6. The first method 100, second method 150 and third method 400 may be executed separately for each of the multiple rechargeable packs 14.

Referring to FIG. 1, the system 10 may include a plurality of sensors in communication (e.g., electronic communication) with the controller C and configured to obtain respective data related to the operation of the device 12 and driving traits of a user U. Referring to FIG. 1, the sensors may include, but are not limited to: a speed sensor 40, brake pedal force sensor 42, accelerator pedal force sensor 44, a steering wheel angle sensor 46 and an inertial sensor 48 configured to obtain lateral acceleration, longitudinal acceleration, device roll and device pitch. The respective data may describe driver traits including, but not limited to: degree and frequency of acceleration and braking, steering control, electric device speed relative to a speed limit, frequency of passing, frequency of changing lanes and driving mode. Driving mode may include information on whether specific modes in the device 12 are engaged. The driving modes may include auxiliary load use (tow/haul engaged), sport mode, four-wheel drive and other modes available to those skilled in the art.

Referring to FIG. 1, the device 12 may include a user interface 50 in communication with the controller C and accessible to the user U. The user U may transmit information to the user interface 50, such as through a touchscreen or keyboard available to those skilled in the art, and receive information. For example, the user U may enter a target charge level (e.g. 80%) through the user interface 50.

Referring to FIG. 1, a charging unit 52 is selectively connectable to and configured to charge portions of the multiple rechargeable packs 14 (when plugged to the charging unit 52) at one or more battery charging rates. The charging unit 52 may be located at a residence, a place of employment, business or another place. The charging unit 52 may be located at a charging station where multiple drivers converge to purchase charging. The device 12 may include a mobile application 54 configured to communicate with the charging unit 52 via a wireless network 56 or other connection available to those skilled in the art. The controller C may be configured to determine the battery charging rate charging unit 52 based in part on a time of day setting, a respective temperature of the multiple rechargeable packs 14 and other factors.

The wireless network 56 may be a Wireless Local Area Network (LAN) which links multiple devices using a wireless distribution method. The wireless network 56 may be a Wireless Metropolitan Area Network (MAN) which connects several wireless LANs. The wireless network 56 may be a Wireless Wide Area Network (WAN) which covers large areas such as neighboring towns and cities. The wireless network 56 may include Bluetooth™ connectivity. Bluetooth™ is an open wireless technology standard for transmitting fixed and mobile electronic device data over short distances and creates personal networks operating within the 2.4 GHz band. It is to be understood that other types of connections may be employed.

The multiple rechargeable packs 14 individually define a respective state of charge ($SOC_i$ for the ith member of the multiple rechargeable packs 14) and an overall state of charge ($SOC_O$) for the entire group. The state of charge refers to the stored charge available to do work relative to that which is available after the multiple rechargeable packs 14 have been fully charged. The state of charge may be viewed as an assessment of stored potential energy, extending between a minimum of 0% and a maximum of 100%. Referring to FIG. 1, the primary pack 16A and the secondary pack 18A are respectively operatively connected to a primary sensor 58 and an auxiliary sensor 60 configured to respectively measure (or otherwise sense) the voltage, current, state of charge (SOC), state of health (SOH) and/or temperature, and provide this information to the controller C. The respective state of charge, overall state of charge and their rates of change may be estimated based on data from the primary sensor 58, auxiliary sensor 60, other sensors and various mathematical models available to those skilled in the art. It is to be understood that each of the multiple rechargeable packs 14 may be operatively connected to a respective sensor.

Figure 2:
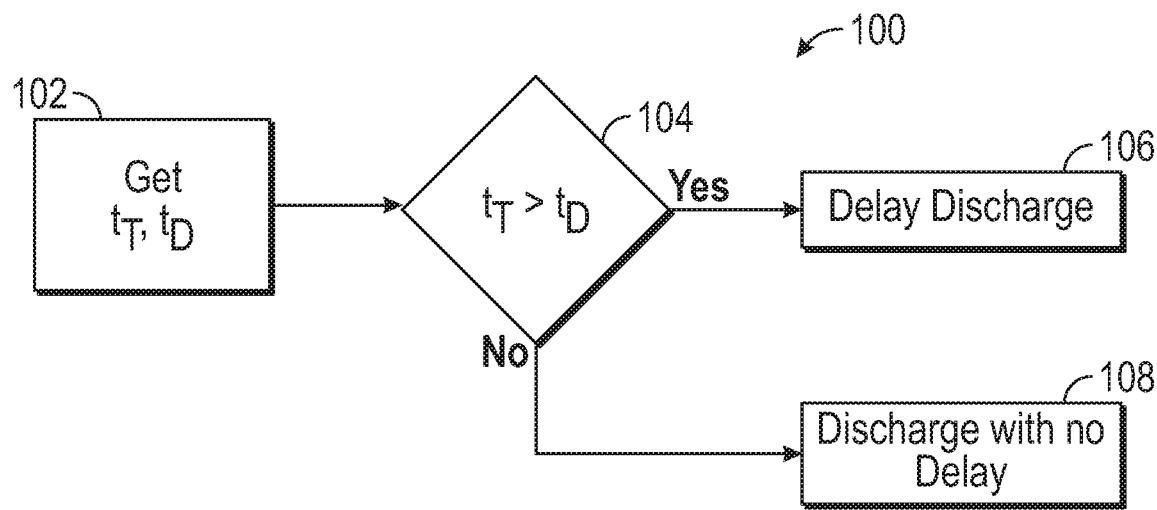
FIG. 2 is a schematic flow diagram of a first method executable by the controller of FIG. 1.

Referring now to FIG. 2, a flowchart of the first method 100 executable by the controller C of FIG. 1 is shown. The first method 100 may begin with block 102, where the controller C is configured to obtain an estimated end of trip time ($t_T$) and a discharging time ($t_D$) for the auxiliary pack 18. The estimated end of trip time ($t_T$) may be based on information selected by the user U via the user interface 50. The discharging time ($t_D$) may be based on a constant discharge rate.

The first method 100 proceeds to block 104 where the controller C is configured to determine if the estimated end of trip time ($t_T$) is greater than the discharging time. If so, per block 106, the discharging of the auxiliary pack 18 is delayed until the respective state of charge of the primary pack 16 reaches a first threshold ($SOC_1$). Per block 108, if the estimated end of trip time is less than or equal to the discharging time ($t_D$), discharging of the auxiliary pack 18 is begun without delay.

The first threshold ($SOC_1$) may correspond to the respective state of charge of the primary pack 16A at which a regeneration event is permitted. During a regeneration event, energy loss due to deceleration of the device 12 is at least partially re-directed to the primary pack 16A. In one example, the first threshold ($SOC_1$) is between 90% and 95%.

Figure 3:
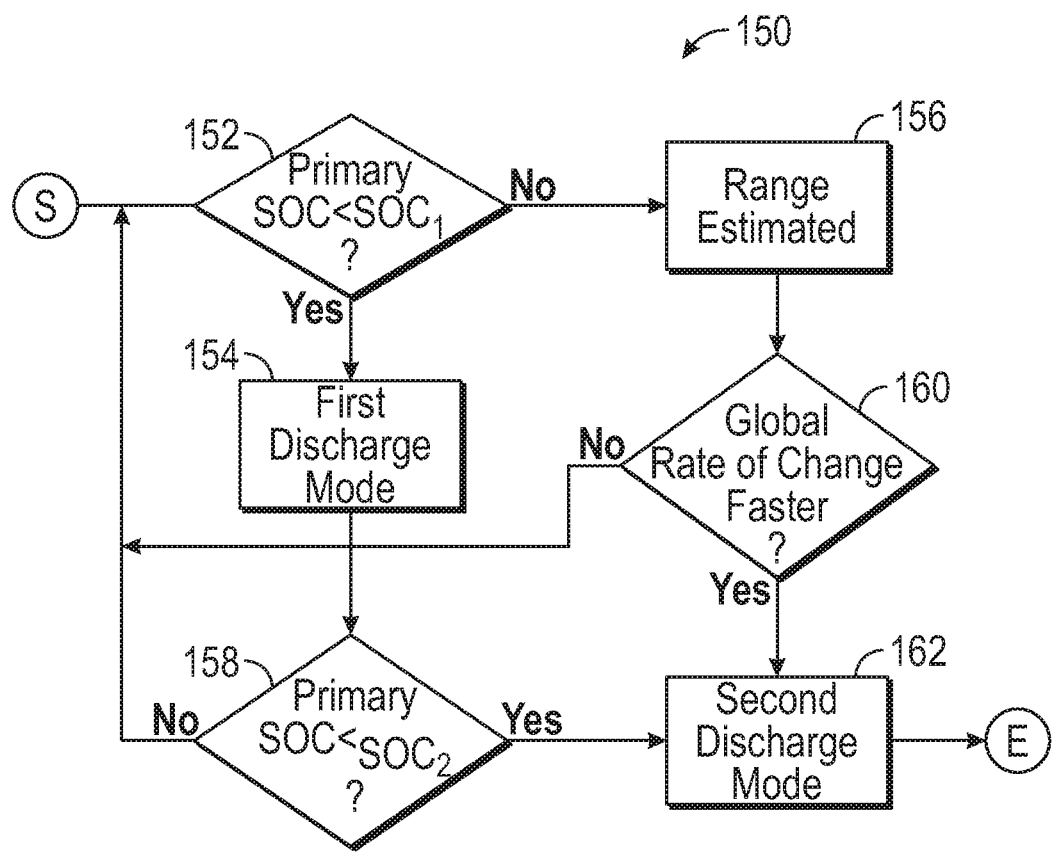
FIG. 3 is a schematic flow diagram of a second method executable by the controller of FIG. 1.

Referring to FIG. 3, a flowchart of the second method 150 executable by the controller C is shown, with start and end denoted by "S" and "E," respectively. The second method 150 may begin with block 152, where the controller C is programmed to determine if the respective state of charge of the primary pack 16 is less than or equal to the first threshold ($SOC_1$). In a non-limiting example, the first threshold is between 90% and 95%. If so, the second method 150 proceeds to block 154, where a first discharge mode is employed to discharge the auxiliary pack 18A. If not, the second method 150 proceeds to block 156.

Figure 4:
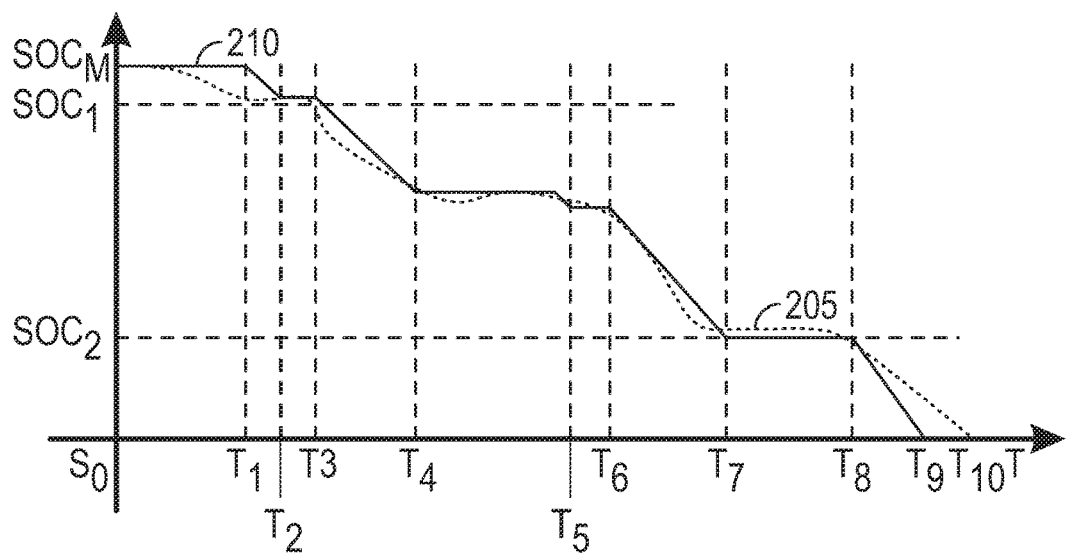
FIG. 4 is a schematic example graph of a first discharge mode that may be employed by the system of FIG. 1, showing state of charge values over time.

FIG. 4 illustrates an example of a first discharge mode. The vertical axis shows state of charge values from a maximum state of charge ($SOC_M$) to a minimum state of charge ($S_0$). The horizontal axis shows various times T ($T_1$, $T_2$, $T_3$, $T_4$, $T_5$, $T_6$, $T_7$, $T_8$, $T_9$, $T_{10}$). Referring to FIG. 4, the trace 205 shows the discharging of the primary pack 16A while trace 210 shows the discharging of the auxiliary pack 18A. The first discharge mode may be characterized by the respective state of charge of the auxiliary pack 18A (trace 210) tracking the respective state of charge of the primary pack 16A (trace 205) to within a predefined percentage (e.g. 5%). Referring to FIG. 4, the controller C may be configured to selectively pause the discharging of the auxiliary pack 18A during a regeneration event (e.g. from time $T_2$ to $T_3$, $T_4$ to just before $T_5$, $T_7$ to $T_8$). Referring to FIG. 4, the total discharge time ($T_9$) of the auxiliary pack 18A may be controlled to be less than or equal to the total discharge time ($T_{10}$) of the primary pack 16A.

From block 154 of FIG. 3, the second method 150 proceeds to block 158. Per block 158, the controller C may be configured to determine if the respective state of charge of the primary pack 16 is less than or equal to a second threshold ($SOC_2$). In a non-limiting example, the second threshold is between 10% and 15%. If so, the second method 150 proceeds to block 162, where a second discharge mode is employed to discharge the auxiliary pack 18. If not, the second method 150 loops back to block 152.

Figure 5:
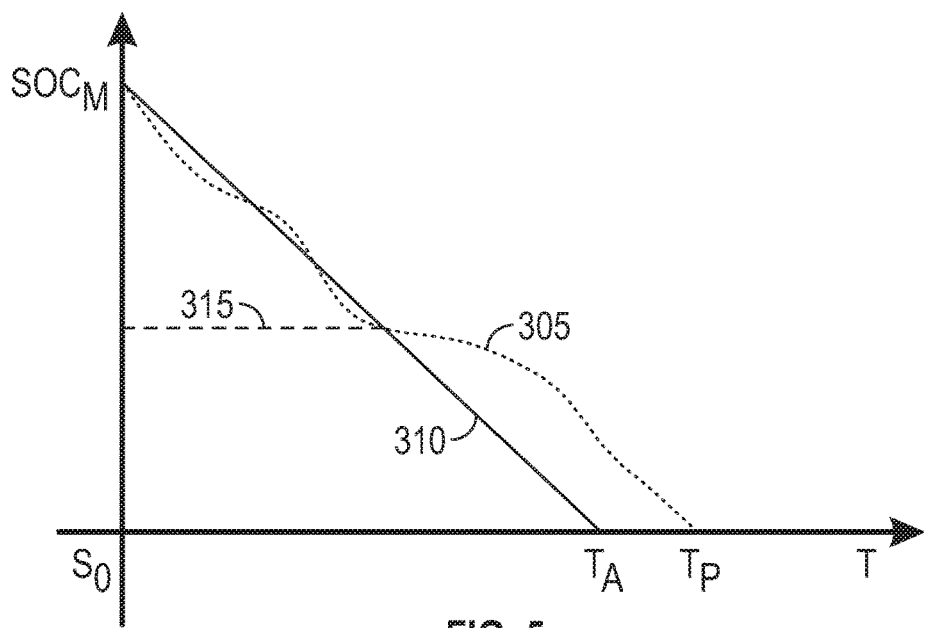
FIG. 5 is a schematic example graph of a second discharge mode that may be employed by the system of FIG. 1, showing state of charge values over time.

FIG. 5 illustrates an example of a second discharge mode. The vertical axis shows state of charge values from the maximum state of charge ($SOC_M$) to the minimum state of charge ($S_0$) and the horizontal axis shows time (T). Referring to FIG. 5, trace 305 shows the discharging of the primary pack 16A while trace 310 shows the discharging of the auxiliary pack 18A. Referring to FIG. 5, the second discharge mode may be characterized by a constant discharge rate (see constant slope of trace 310) selected such that the total discharge time ($T_A$) of the auxiliary pack 18A is less than or equal to the total discharge time ($T_P$) of the primary pack 16A. At the cross-over point 315, the discharge rate of the auxiliary pack 18A significantly exceeds the discharge rate of the primary pack 16A.

Per block 156 of FIG. 3, (when the respective state of charge of the primary pack 16A is greater than the first threshold ($SOC_2$)), the controller C is configured to obtain range estimates, in other words, a rate of change in the respective state of charge ($dSOC_A/dt$) of the auxiliary pack 18A and the rate of change in an overall state of charge ($dSOC_O/dt$) of the multiple rechargeable packs 14.

Obtaining the rate of change in the overall state of charge ($dSOC_O/dt$) of the multiple rechargeable packs 14 may include obtaining an estimated energy consumption for the multiple rechargeable packs 14 based at least partially on a driving model of the user U. For example, the controller C may be programmed to construct the driving model of the user U based at least partially on the respective data obtained by the plurality of sensors described above. The controller C may be configured to store a plurality of statistical models of driving style available to those skilled in the art, and match the driving model of the user U with at least one of the plurality of statistical models of driving style, i.e., one with the closest correlation, based at least partially on the respective data. The controller C may be specifically programmed to build and identify statistical models of driving style based on data from a driver database, for example, maintained by a fleet management unit.

The estimated energy consumption for the multiple rechargeable packs 14 may be modified by one or more correction factors. The controller C may be configured to obtain at least one correction factor for the estimated energy consumption based on information selected by the user U on the user interface 50. For example, the user U may be requested to select between "mostly highway speed" and "mostly non-highway speed." The user U may be requested to select between "auxiliary load use" (tow/haul engaged) and "no auxiliary load use" (tow/haul not engaged). By way of a non-limiting example, if the user U selects "mostly highway speed", then the controller C may be configured to employ a first correction factor of 1.07 (7% increase). If the user U selects "mostly non-highway speed," then the controller C may be configured to employ a second correction factor of 0.93 (7% decrease).

The rate of change in the respective state of charge ($dSOC_A/dt$) of the auxiliary pack 18A may be based in part on a look-up repository correlating anticipated speed (miles per hour) and an energy consumption rate (Watt-hour per mile) of the auxiliary pack 18. The look-up repository may be obtained through calibration in a test cell or laboratory.

From block 156, the second method 150 proceeds to block 160. The multiple rechargeable packs 14 define an overall state of charge ($SOC_O$). Per block 160, the controller C is configured to determine if a rate of change in the global or overall state of charge ($dSOC_O/dt$) is greater than the rate of change in the respective state of charge ($dSOC_A/dt$) of the auxiliary pack 18. If so, the second method 150 proceeds to block 162, where the second discharge mode (see FIG. 5) is employed. If not, the second method 150 loops back to block 152 from block 160.

In another strategy, the controller C may be configured to command a maximum allowable discharge from the auxiliary pack 18A when a rate of change in the overall state of charge ($dSOC_O/dt$) is greater than the rate of change in the respective state of charge ($dSOC_A/dt$) of the auxiliary pack 18A.

Figure 6:
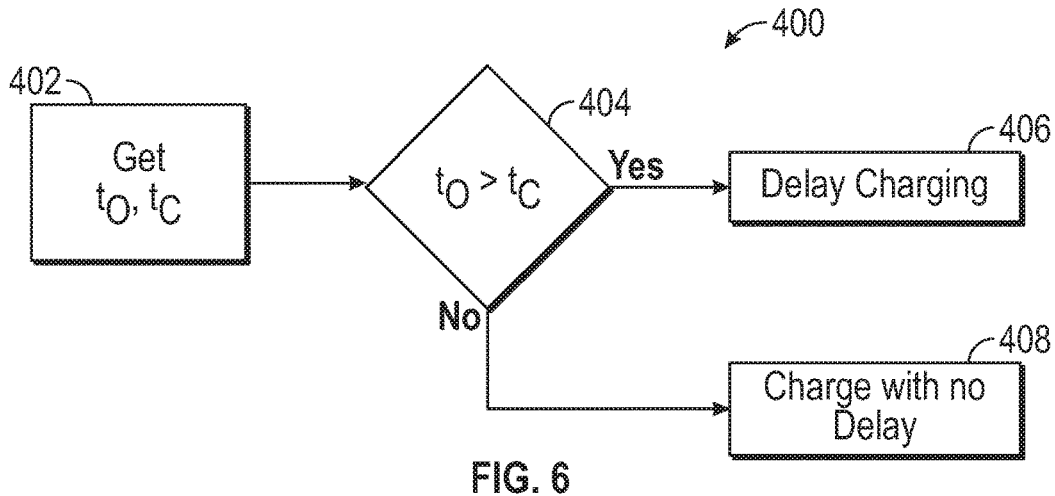
FIG. 6 is a schematic flow diagram of a third method executable by the controller of FIG. 1.

Referring now to FIG. 6, a flowchart of the third method 400 executable by the controller C of FIG. 1 is shown. Per block 402, the controller C is configured to determine an overall charging time ($t_O$) for the multiple rechargeable packs 14 and an auxiliary charging time ($t_C$) for the auxiliary pack 18A. The overall charging time ($t_O$) may be based in part on a battery charging rate of the charging unit 52 (see FIG. 1), which is dependent on a time of day setting, a target charge level (set by the user U) and a respective temperature of the multiple rechargeable packs 14. Per block 404, the controller C is configured to determine if the overall charging time ($t_O$) is greater than the auxiliary charging time ($t_C$). If so, per block 406, the charging of the auxiliary pack 18A is delayed such that the (overall) multiple rechargeable packs 14 and the auxiliary pack 18A finish charging at the same time. If not, per block 408, the charging of the auxiliary pack 18A is started with no delay.

In another strategy, the controller C may be configured to command the charging of the auxiliary pack 18A to a predefined bulk rate and obtain an additional cost for charging the auxiliary pack 18A from the predefined bulk rate to a maximum state of charge. The controller C is configured to obtain a cost optimization point based on the information provided by the user U. When the additional cost is greater than the cost optimization point, the charging of the auxiliary pack 18A at the charging unit may be discontinued. For example, if the predefined bulk rate is selected to be 80%, the cost optimization point is selected to be $50 and the additional cost for charging from 80% to 100% is $65, the charging of the auxiliary pack 18A is discontinued.

In yet another strategy, the controller C may be configured to compare a primary charging time of the primary pack 16A and the auxiliary charging time for the auxiliary pack 18A. When the auxiliary charging time is greater than the primary charging time, the charging of the auxiliary pack 18A may begin. In yet another strategy, the controller C may be programmed to charge the member of the multiple rechargeable packs 14 requiring the longest charging time first such that each of the multiple rechargeable packs 14 finishes charging at the same time. In other words, the charging order multiple rechargeable packs 14 may be staggered (longest charging time to shortest charging time) to allow the multiple rechargeable packs 14 to finish charging at the same time.

In summary, the system 10 is configured to control multiple sources of energy having at least two different capacities, in order to achieve an efficient overall energy delivery requirement across different load scenarios. Accordingly, the system 10 improves the functioning of the device 12. The methods described herein may be dynamically executed and/or may run continuously while the device 12 is powered on. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The first method 100, second method 150 and third method 400 need not be applied in the specific order recited herein and some steps may be eliminated. It is to be understood that the methods described herein may be selectively applied, i.e., a particular application may include one method but not the other two.

The flowchart in FIGS. 2, 3 and 6 illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The controller C of FIG. 1 may be an integral portion of, or a separate module operatively connected to, other controllers of the device 12. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or multiple other desired characteristics from other embodiments, resulting in other embodiments not described in words or by reference to the drawings. Accordingly, such other embodiments fall within the framework of the scope of the appended claims.

What is claimed is:

1. A system of controlling a device with multiple rechargeable packs, the system comprising:
   a controller configured to selectively command one or more of the multiple rechargeable packs to begin at least one of discharging and charging, each of the multiple rechargeable packs defining a respective state of charge;
   wherein the multiple rechargeable packs include at least one primary pack characterized by a first capacity and at least one auxiliary pack characterized by a second capacity, the first capacity being greater than the second capacity;
   wherein the controller includes a processor and tangible, non-transitory memory on which instructions are recorded, execution of the instructions by the processor causing the controller to:
      obtain an estimated end of trip time based in part on information provided by a user;
      determine a discharging time for the at least one auxiliary pack;
      when the estimated end of trip time is greater than the discharging time, delay the discharging of the at least one auxiliary pack until the respective state of charge of the at least one primary pack reaches a first threshold; and
      when the estimated end of trip time is less than or equal to the discharging time, begin the discharging of the at least one auxiliary pack.

2. The system of claim 1, wherein:
   the first threshold corresponds to the respective state of charge of the at least one primary pack when a regeneration event is permitted; and
   the regeneration event is characterized by an energy loss during a deceleration of the device being at least partially re-directed to the at least one primary pack.

3. The system of claim 1, wherein the first threshold is between 90% and 95%.

4. The system of claim 1, wherein:
   the multiple rechargeable packs are respectively configured as removable modules respectively having at least one of an energy transfer converter and a switch.

5. The system of claim 1, wherein the controller is configured to:
   selectively pause the discharging of the at least one auxiliary pack during a regeneration event, the regeneration event being characterized by an energy loss during a deceleration of the device being at least partially re-directed to the at least one primary pack.

6. The system of claim 1, wherein:
   the controller is configured to determine if the respective state of charge of the at least one primary pack is less than or equal to the first threshold;
   the controller is configured to employ a first discharge mode to discharge the at least one auxiliary pack when the respective state of charge of the at least one primary pack is less than or equal to the first threshold; and
   the first discharge mode is characterized by the respective state of charge of the at least one auxiliary pack tracking the respective state of charge of the at least one primary pack to within a predefined percentage.

7. The system of claim 1, wherein:
   the controller is configured to determine if the respective state of charge of the at least one primary pack is less than or equal to a second threshold;
   the controller is configured to employ a second discharge mode to discharge the at least one auxiliary pack when the respective state of charge of the at least one primary pack is less than or equal to the second threshold, the second threshold being less than the first threshold; and
   the second discharge mode is characterized by a constant discharge rate selected such that a total discharge time of the at least one auxiliary pack is less than or equal to the total discharge time of the at least one primary pack.

8. The system of claim 7, wherein the second threshold is between 10% and 15%.

9. The system of claim 1, wherein the controller is configured to:
- when the respective state of charge of the at least one primary pack is greater than the first threshold, obtain a rate of change in the respective state of charge of the at least one auxiliary pack ($dSOC_A/dt$) and the rate of change in an overall state of charge of the multiple rechargeable packs ($dSOC_O/dt$); and
- employ the second discharge mode to discharge the at least one auxiliary pack, when the rate of change in the overall state of charge ($dSOC_O/dt$) is greater than the rate of change in the respective state of charge of the at least one auxiliary pack ($dSOC_A/dt$).

10. The system of claim 9, wherein obtaining the rate of change in the overall state of charge ($dSOC_O/dt$) of the multiple rechargeable packs includes:
- obtaining an estimated energy consumption for the multiple rechargeable packs based at least partially on a driving model of the user, via the controller; and
- obtaining one or more correction factors based in part on the information selected by a user via a user interface, including a first correction factor for highway speed and a second correction factor for auxiliary load use.

11. The system of claim 10, further comprising:
- a plurality of sensors configured to obtain respective data, the plurality of sensors including at least one of a speed sensor, a brake pedal force sensor, an accelerator pedal force sensor and an inertial sensor; and
- wherein the controller is programmed to store a plurality of statistical models of driving style and construct the driving model of the user by correlating the respective data with at least one of the plurality of statistical models of driving style.

12. The system of claim 1, further comprising:
- a charging unit selectively connectable to and configured to charge at least one of the multiple rechargeable packs at a battery charging rate, the controller being further configured to:
  - determine the battery charging rate based in part on a time of day setting, a target charge level and a respective temperature of the multiple rechargeable packs, the target charge level being selected by the user;
  - determine an overall charging time for the multiple rechargeable packs and an auxiliary charging time for the at least one auxiliary pack; and
  - begin the charging the at least one auxiliary pack when the auxiliary charging time is greater than the overall charging time.

13. The system of claim 12, wherein the controller is configured to:
- command the charging of the at least one auxiliary pack to a predefined bulk rate;
- obtain an additional cost for charging the at least one auxiliary pack from the predefined bulk rate to a maximum state of charge;
- obtain a cost optimization point based in part on information provided by the user; and
- when the additional cost is greater than the predefined cost optimization point, discontinue the charging of the at least one auxiliary pack at the charging unit.

14. A method of controlling operation of a device having multiple rechargeable packs, the device having a controller with a processor and tangible, non-transitory memory, the method comprising:
- configuring the controller to selectively command one or more of the multiple rechargeable packs to begin at least one of discharging and charging, each of the multiple rechargeable packs defining a respective state of charge;
- including at least one primary pack characterized by a first capacity and at least one auxiliary pack characterized by a second capacity in the multiple rechargeable packs, the first capacity being greater than the second capacity;
- obtaining an estimated end of trip time based in part on information provided by a user, via the controller;
- determining a discharging time for the at least one auxiliary pack, via the controller;
- delaying the discharging of the at least one auxiliary pack until the respective state of charge of the at least one primary pack reaches a first threshold, when the estimated end of trip time is greater than the discharging time, via the controller; and
- beginning the discharging of the at least one auxiliary pack, when the estimated end of trip time is less than or equal to the discharging time, via the controller.

15. The method of claim 14, further comprising:
- selecting the first threshold to correspond to the respective state of charge of the at least one primary pack when a regeneration event is permitted, the regeneration event being characterized by an energy loss during a deceleration of the device being at least partially re-directed to the at least one primary pack.

16. The method of claim 14, further comprising:
- determining if the respective state of charge of the at least one primary pack is less than or equal to the first threshold, via the controller;
- employing a first discharge mode to discharge the at least one auxiliary pack when the respective state of charge of the at least one primary pack is less than or equal to the first threshold, the first discharge mode being characterized by the respective state of charge of the at least one auxiliary pack tracking the respective state of charge of the at least one primary pack to within a predefined percentage;
- determining if the respective state of charge of the at least one primary pack is less than or equal to a second threshold, via the controller; and
- employing a second discharge mode to discharge the at least one auxiliary pack when the respective state of charge of the at least one primary pack is less than or equal to the second threshold, the second threshold being less than the first threshold and the second discharge mode being characterized by a constant discharge rate selected such that a total discharge time of the at least one auxiliary pack is less than or equal to the total discharge time of the at least one primary pack, via the controller.

17. The method of claim 16, further comprising:
- obtaining a rate of change in the respective state of charge of the at least one auxiliary pack ($dSOC_A/dt$) and the rate of change in an overall state of charge of the multiple rechargeable packs ($dSOC_O/dt$), when the respective state of charge of the at least one primary pack is greater than the first threshold, via the controller; and
- employing the second discharge mode, when the rate of change in the overall state of charge ($dSOC_O/dt$) is greater than the rate of change in the respective state of charge of the at least one auxiliary pack ($dSOC_A/dt$), via the controller.

18. The method of claim 17, wherein obtaining the rate of change in the overall state of charge ($dSOC_O/dt$) of the multiple rechargeable packs includes:
  obtaining respective data from a plurality of sensors including at least one of a speed sensor, a brake pedal force sensor, an accelerator pedal force sensor and an inertial sensor, via the controller;
  storing a plurality of statistical models of driving style and constructing a driving model of the user by correlating the respective data with at least one of the plurality of statistical models of driving style, via the controller;
  obtaining an estimated energy consumption for the multiple rechargeable packs based at least partially on the driving model of the user, via the controller; and
  obtaining one or more correction factors based in part on the information selected by a user via a user interface, including a first correction factor for highway speed and a second correction factor for auxiliary load use.

19. The method of claim 14, further comprising:
  configuring a charging unit to selectively charge at least one of the multiple rechargeable packs at a battery charging rate:
  determining the battery charging rate based in part on a time of day setting, a target charge level and a respective temperature of the multiple rechargeable packs, the target charge level being selected by the user, via the controller;
  determining an overall charging time for the multiple rechargeable packs and an auxiliary charging time for the at least one auxiliary pack, via the controller; and
  beginning the charging the at least one auxiliary pack when the auxiliary charging time is greater than the overall charging time, via the controller.

20. The method of claim 14, further comprising:
  commanding the charging of the at least one auxiliary pack to a predefined bulk rate, via the controller;
  obtaining an additional cost for charging the at least one auxiliary pack from the predefined bulk rate to a maximum state of charge, via the controller;
  obtaining a cost optimization point based in part on information provided by the user; and
  discontinuing the charging of the at least one auxiliary pack at the charging unit when the additional cost is greater than the predefined cost optimization point, via the controller.

\* \* \* \* \*